United States Patent
Lu et al.

(10) Patent No.: US 12,012,136 B2
(45) Date of Patent: Jun. 18, 2024

(54) PLATFORM AND METHOD FOR INTELLIGENT MANAGEMENT OF INTEGRATION OF CONSTRUCTION AND MAINTENANCE OF RAIL TRANSPORTATION WORK

(71) Applicant: JINAN RAIL TRANSIT GROUP CO., LTD., Shandong (CN)

(72) Inventors: Linhai Lu, Jinan (CN); Bingbing Hu, Jinan (CN); Yongjun Wang, Jinan (CN); Jiahai Liu, Jinan (CN); Xuezeng Liu, Jinan (CN); Zhiguo Li, Jinan (CN); Lianyong Sun, Jinan (CN); Yongli Hu, Jinan (CN); Gang Li, Jinan (CN); Zhihai Sun, Jinan (CN)

(73) Assignee: JINAN RAIL TRANSIT GROUP CO., LTD., Jinan (CN)

( * ) Notice: Subject to any disclaimer, the term of this patent is extended or adjusted under 35 U.S.C. 154(b) by 269 days.

(21) Appl. No.: 17/763,055

(22) PCT Filed: Nov. 22, 2019

(86) PCT No.: PCT/CN2019/120385
§ 371 (c)(1),
(2) Date: Mar. 23, 2022

(87) PCT Pub. No.: WO2021/056791
PCT Pub. Date: Apr. 1, 2021

(65) Prior Publication Data
US 2022/0332356 A1    Oct. 20, 2022

(30) Foreign Application Priority Data
Sep. 23, 2019   (CN) .......................... 201910901166.3

(51) Int. Cl.
*B61L 23/34* (2006.01)
*B61L 23/06* (2006.01)

(52) U.S. Cl.
CPC ............... *B61L 23/34* (2013.01); *B61L 23/06* (2013.01)

(58) Field of Classification Search
CPC ....... B61L 23/34; B61L 23/06; G06Q 10/063; G06Q 10/20; G06Q 10/06316; G06F 16/29
(Continued)

(56) References Cited

U.S. PATENT DOCUMENTS

| | | | |
|---|---|---|---|
| 2015/0058233 A1* | 2/2015 | Budlong | ................ G06Q 50/16 705/315 |
| 2019/0138667 A1* | 5/2019 | Benesh | ................. G06Q 50/08 |

FOREIGN PATENT DOCUMENTS

| | | |
|---|---|---|
| CN | 105912655 A | 8/2016 |
| CN | 106503381 A | 3/2017 |

(Continued)

OTHER PUBLICATIONS

He et al.; "Safety Early Warning Technology of Metro Tunnel Based on the Application of BIM+GIS;" Urban Mass Transit; 2019; pp. 161-164; No. 7.
(Continued)

*Primary Examiner* — Muhammad Shafi
(74) *Attorney, Agent, or Firm* — Oliff PLC

(57) ABSTRACT

The present invention discloses a platform and method for intelligent management of integration of construction and maintenance of rail transportation work, comprising: a work construction information sharing module based on GIS and BIM is configured to realize the integration and data sharing between BIM model of each station and section of the rail transportation and a 3D geological management platform of
(Continued)

PLATFORM FOR INTELLIGENT MANAGEMENT OF INTEGRATION OF CONSTRUCTION AND MAINTENANCE OF RAIL TRANSPORTATION WORK rail transportation; a work construction informatization management module based on progress control is configured to provide an information control of work preparation plan, contract performance and measurement and pricing, safety and quality investigation, risk early warning and design change in the work construction stage; a rail transportation operation and maintenance module based on the integration of construction and maintenance is configured to provide an information management and control of equipment, materials and safety risk early warning in the rail transportation operation and maintenance stage. The present invention overcomes the shortcomings of single function of traditional technical methods and poor data effectiveness, and improving the sharing of engineering construction data resources, intelligent progress control and traceability of historical problems.

10 Claims, 1 Drawing Sheet

(58) Field of Classification Search
USPC .......................................................... 701/19
See application file for complete search history.

(56) References Cited

FOREIGN PATENT DOCUMENTS

| CN | 106651663 | A |   | 5/2017 |
|----|-----------|---|---|--------|
| CN | 107194861 |   | * | 9/2017 |
| CN | 107194861 | A |   | 9/2017 |
| CN | 107688908 | A |   | 2/2018 |
| CN | 108090610 |   | * | 5/2018 |
| CN | 108090610 | A |   | 5/2018 |
| CN | 108550086 |   | * | 9/2018 |
| CN | 108550086 | A |   | 9/2018 |
| CN | 109582748 | A |   | 4/2019 |
| CN | 109960894 |   | * | 7/2019 |
| CN | 109960894 | A |   | 7/2019 |
| CN | 110175368 |   | * | 8/2019 |
| CN | 110175368 | A |   | 8/2019 |
| WO | 2008/033127 | A1 |   | 3/2008 |

OTHER PUBLICATIONS

Xia et al.; "Research on the Application of BIM and 3DGIS in Urban Rail Transit;" URBAN Geotechnical Investigation & Surveying; 2019; pp. 10-11; No. 4.

Hu, Kang; Study the smart park O&M management information system based on BIM; Chinese Excellent Doctoral and Master Dissertations, Fulltext Database Information Technology; Heifei University of Technology; 2018.

Sun, Runrun; "Research on Schedule Management of Urban Rail Transit Project Based on BIM Technology;" Chinese Excellent Doctoral and Master Dissertations, Fulltext Database (Master) Engineering Technology; China University of Mining and Technology; 2016.

Jun. 23, 2020 Search Report issued in International Patent Application No. PCT/CN2019/120385.

Jun. 23, 2020 Written Opinion of the International Searching Authority issued in International Patent Application No. PCT/CN2019/120385.

Nov. 25, 2021 Office Action issued in Chinese Patent Application No. 201910901166.3.

* cited by examiner

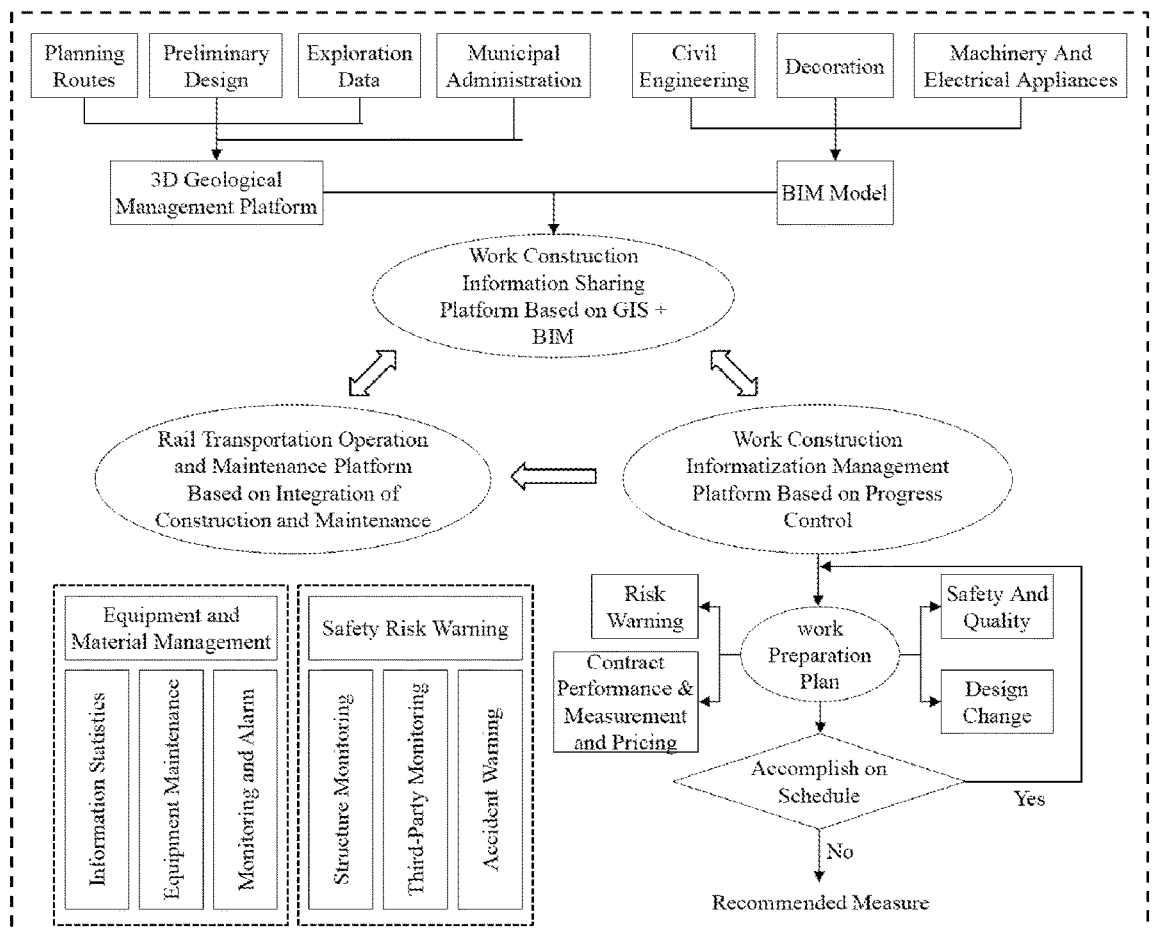
PLATFORM FOR INTELLIGENT MANAGEMENT OF INTEGRATION OF CONSTRUCTION AND MAINTENANCE OF RAIL TRANSPORTATION WORK

PLATFORM AND METHOD FOR INTELLIGENT MANAGEMENT OF INTEGRATION OF CONSTRUCTION AND MAINTENANCE OF RAIL TRANSPORTATION WORK

TECHNICAL FIELD

The present invention relates to the technical field of construction and maintenance of rail transportation, in particular to a platform and method for intelligent management of integration of construction and maintenance of rail transportation work.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art Urban rail transportation work has the characteristics of large construction scale, long construction cycle, complex surrounding environment and many professional domains involved. There are many problems such as large number of engineering files and long time span, diverse and complex data, complex relationship between engineering construction and surrounding geological environment and existing structures (buildings), and inconsistent interface information among disciplines, as a result, the information in the construction, operation and maintenance stage of urban rail transportation work cannot form a unified data structure, and cannot be associated and shared with data resources, which will affect the progress and efficiency of work construction, and seriously affect the quality and safety of work construction.

In addition, in the traditional management, a data transfer mode of completion acceptance nature is often used in the work construction and operation and maintenance stage, which is very difficult to realize the process and historical data transfer in the work construction stage, which affects the collection of basic data of risk control in the later operation and maintenance stage, and the traceability of historical problems is poor.

The technical scheme disclosed in the prior art to realize the construction of a process during the construction period based on Building Information Module (BIM) model technology, or to realize the information management in the construction stage, can only be applied to the aboveground industrial and civil construction works with relatively fixed structure, and the patented technology can only realize the three-dimensional display of the design scheme, and cannot realize the control of construction progress and quality of the work, Moreover, it is impossible to integrate the full cycle data of construction, operation and maintenance.

SUMMARY

In order to solve the above problems, the invention proposes a platform and method for intelligent management of integration of construction and maintenance of rail transportation work, which realizes the informatization of construction, operation and maintenance of urban rail transportation work based on a Geographic Information System (GIS) and a BIM model technique and combined with advantages of an information management platform.

In some embodiments, the following technical solution is adopted:
a platform for intelligent management of integration of construction and maintenance of rail transportation work, comprising:
a work construction information sharing module based on GIS and BIM, being configured to realize a fusion and data sharing between a BIM model of each station and section of rail transportation and a 3D geological management platform of rail transportation, and providing a basic data support for a work construction informatization management module based on progress control and a rail transportation operation and maintenance module based on the integration of construction and maintenance;
the work construction informatization management module based on progress control, being configured to, based on the basic data provided by the work construction information sharing module based on GIS and BIM, provide an informatization management and control of a work preparation plan, a contract performance and measurement and pricing, a safety and quality investigation, a risk early warning and a design change in a work construction phase;
the rail transportation operation and maintenance module based on the integration of construction and maintenance, being configured to, based on the basic data provided by the work construction information sharing module based on GIS and BIM, provide an information management and control of equipment, materials and safety risk early warning in a rail transportation operation and maintenance phase.

In other embodiments, the following technical solution is adopted:
a method for intelligent management of integration of construction and maintenance of rail transportation work, comprising:
establishing a three-dimensional geological management platform based on engineering geological exploration data of rail transportation work;
generating a BIM model for each station and section according to construction drawings of rail transportation construction stage;
revising a 3D geological management platform according to municipal design drawings of rail transportation;
fusing the BIM model of stations and sections with the revised 3D geological management platform to realize data sharing;
conducting an attribute assignment for differentiating unit, division and subdivision for the BIM model of each station and section;
based on the above shared data, establishing respectively a work construction informatization management platform based on progress control for realizing the informatization management and control in the work construction phase and a rail transportation operation and maintenance platform based on integration of construction and maintenance for realizing the informatization management and control in the rail transportation operation and maintenance phase.

Compared with the prior art, the beneficial effect of the present invention is:
there can overcome shortcomings of single function of traditional technical methods and poor data effectiveness, and improve the sharing of engineering construction data resources, intelligent progress control and traceability of historical problems.

BRIEF DESCRIPTION OF THE DRAWINGS

FIG. 1 is a structural diagram of intelligent management system for integration of construction and maintenance of rail transportation work in Embodiment 1.

DETAILED DESCRIPTION

It should be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms 'comprise' and/or 'include' used in this specification indicate that there are features, steps, operations, devices, components, and/or combinations thereof.

Example 1

In one or more embodiments, disclosed a platform for intelligent management of integration of construction and maintenance of rail transportation work, as shown in FIG. 1, comprising:

a work construction information sharing module based on GIS and BIM, being configured to realize a fusion and data sharing between a BIM model of each station and section of the rail transportation and a 3D geological management platform of rail transportation, and providing a basic data support for a work construction informatization management module based on progress control and a rail transportation operation and maintenance module based on integration of construction and maintenance;

the work construction informatization management module based on progress control, being configured to provide the basic data for the work construction information sharing module based on GIS and BIM, that is, providing, in a work construction phase, an informatization management and control of a work preparation plan, a contract performance and measurement and pricing, a safety and quality investigation, a risk early warning and a design change;

the rail transportation operation and maintenance module based on the integration of construction and maintenance, being configured to provide the basic data for the work construction information sharing module based on GIS and BIM, that is, providing, in a rail transportation operation and maintenance phase, the informatization management and control of equipment, materials and safety risk early warning.

wherein, the 3D geological management platform of rail transportation, specifically comprising:

according to work planning and construction route maps and preliminary design of the station building maps, generating a first edition of the 3D geological management platform integrating geology, geophysical exploration pipeline, station line and station contour model through GIS software, to count collision situation between pipelines and stations;

according to municipal pipeline relocation and restoration maps and municipal pipeline connection maps, adding municipal pipeline information to the first edition of the 3D geological management platform through GIS software to form the 3D geological management platform for rail transportation and count the collision situation between the pipelines and the stations.

A construction process of the BIM model of each station and section of rail transportation is as follows:

according to architectural drawings and structural drawings of the stations and sections of rail transportation, through the BIM modeling, generating a civil BIM model of each station and section; counting a collision situation of components in the civil BIM model;

according to decoration drawings of stations of rail transportation, through the BIM modeling, generating a decoration BIM model of each station; counting the collision situation of components in the decoration BIM model of each station;

according to electromechanical installation drawings of rail transportation station, through the BIM modeling, generating a electromechanical BIM model of each station and section; counting the collision situation of components in the electromechanical BIM model of each station;

adding equipment information to the electromechanical BIM model of each station and section;

adding the decoration BIM model and electromechanical BIM model of each station and section to the civil BIM model of each station and section to form the BIM model of each station and section of rail transportation; counting the collision situation of components in BIM model of each station and section.

Providing a basic data, by the engineering construction information sharing module of GIS and BIM, the basic data includes: a sharing between geological exploration and pipelines of the 3D geological management platform and spatio-temporal pipeline and attribute feature information of the BIM model.

The work construction informatization management module based on progress control, comprising:

a work preparation planning unit, being configured to realize a formulation, an implementation, an assessment and an archiving of the work preparation plan of a supervision unit and contractors;

a contract performance and measurement and pricing unit, being configured to realize a measurement, a payment and an archiving of work funds of the supervision unit and the contractors;

a safety and quality investigation unit, being configured to realize an investigation issuance, a rectification reporting, an assessment and an archiving of hidden dangers of work safety and quality of the supervision unit and the contractors;

a risk early warning management and control unit, being configured to realize an upload, an analyze, a warning, an assessment and an archiving of monitoring data of a third-party monitoring unit;

a design change management unit, being configured to realize a work visa, a design change process handling, an assessment and an archiving of the supervision unit and contractors.

The rail transportation operation and maintenance module based on the integration of construction and maintenance, comprising:

an equipment and materials management unit, being configured to realize the information statistics, query and analysis of equipment and materials, equipment maintenance management and reminder, equipment operation and maintenance monitoring and fault equipment alarm;

wherein, the information statistics, query and analysis functions of equipment and materials, including equipment and materials used for operation and maintenance and equipment and materials of spare parts.

The function of the equipment maintenance management and reminder refers to maintenance period statistics, query and reminder of equipment used in operation and maintenance.

The equipment operation and maintenance monitoring function, being realized through signal linkage with equipment systems of a FAS (Fire Alarm System), a BAS (Building Automation System) and an ISCS (Integrated Supervisory Control System).

The function of the fault equipment alarm refers to an alarm when the equipment used for operation and maintenance fails.

A safety risk early warning unit, being configured to realize tunnel structure monitoring, third-party measurement and control, and safety accident early warning and handling;

wherein, the tunnel structure monitoring includes the functions of on-site investigation, upload, rectification and feedback of underground tunnel segments, mine tunnels and other structures.

The third-party measurement and control refers to collection and analysis of third-party monitoring data during rail transportation operation and maintenance, and alarm when the measurement control value is exceeded.

The safety accident early warning and handling refers to that during the operation and maintenance of rail transportation, when a safety accident occurs or is predicted, the on-site patrol personnel shall patrol and report it, and the relevant responsible person shall rectify and give a feedback.

Example 2

In one or more embodiments, providing a method for intelligent management of integration of construction and maintenance of rail transportation work, specifically comprising the steps of:

step (1): establishing a first edition of a 3D geological management platform based on geological exploration data of rail transportation works; the specific process is as follows:

step (1-1): according to work planning and construction route maps, preliminary design station building maps and other data, through a GIS software, generating an contour model for an work line and station of the geological management;

step (1-2): in the GIS software, based on the generated contour model of the work line and station, and according to detailed survey and geophysical exploration report of work construction, conducting a further calculation and analysis, generating the first edition of the 3D geological management platform integrating geology, geophysical exploration pipeline, station line and station contour model;

step (1-3): forming a survey collision detection report through a collision situation between pipeline and station in the first edition of 3D geological management platform, distributing the report to a supervision unit of the work construction and contractors;

wherein, the supervision unit refers to an work supervision unit or design consulting unit; the contractor refers to an work construction unit or design unit.

Step (2): generating a BIM model for each station and section according to construction drawings of rail transportation construction phase; the specific process is as follows:

step (2-1): based on architectural drawings and structural drawings of stations and sections of rail transportation, through a BIM modeling software, generating a civil BIM model for each station and section, and forming a collision situation of components of the civil BIM model into a civil collision detection report, and distributing the report to the work construction supervision unit and contractors;

step (2-2): according to decoration drawings of rail transportation stations, through the BIM modeling software, generating a decoration BIM model for each station, and forming collision situations of the components of decoration BIM model of each station into a decoration collision detection report, and distributing the report to the work construction supervision unit and the contractor;

step (2-3): according to electromechanical installation drawings of rail transportation stations, through the BIM modeling software, generating an electromechanical BIM model for each station and section, and forming collision situations of components of the electromechanical BIM model of each station into an electromechanical collision detection report, and distributing the report to the work construction supervision unit and the contractor;

step (2-4): according to equipment information such as equipment family provided by the equipment manufacturer, adding the equipment information such as equipment family in the electromechanical BIM model of each station and section;

step (2-5): adding the decoration BIM model and the electromechanical BIM model (including equipment family) of each station and section to the civil BIM model of each station and section to form the BIM model of each station and section of rail transportation, and forming the collision situation of components in the BIM model of each station and section into a professional interface collision detection report, and distributing the report to the work construction supervision unit and the contractor.

Step (3): according to municipal design drawings of rail transportation, further revising the first edition of the 3D geological management platform. Specifically, adding municipal pipeline relocation and restoration maps, municipal pipeline connection maps and other data, through the GIS software, into the first edition of the 3D geological management platform to reasonably adjust the conflicting pipelines and forming a municipal pipeline collision detection report, and forming the 3D geological management platform, and distributing the municipal pipeline collision detection report to the work construction supervision unit and the contractor.

Step (4): fusing the BIM model of each station and section with the 3D geological management platform to realize a data sharing, and establishing an work construction information sharing platform based on GIS+BIM; the specific process is as follows:

step (4-1): generating the BIM model of each station and section into a model data set, simplifying a data volume of the BIM and ensuring the data usage function simultaneously through technologies of instantiation, model lightweight, BIM cache generation and so on;

wherein, the data usage function mainly includes query of spatial information, network analysis of the pipeline (two-dimensional and three-dimensional), acquisition of section of the BIM model, 3D spatial analysis, measurement and calculation (elevation, distance and area), simulation of construction progress, etc;

step (4-2): through the GIS software, adding the model data set to the 3D geological management platform, and making appropriate adjustment and optimization, to establish a data fusion and sharing platform between the BIM model of each station and section and the 3D geological management platform.

Step 5: conducting an attribute assignment of unit, divisional and sub-divisional for the BIM model of each station and section; the specific process is as follows:

step (5-1): according to 'Standard for differentiating unit work, division work and subdivision work of rail transportation', establishing a coding rule of an attribute assignment of differentiating unit, division and subdivision in the BIM model of each station and section;

step (5-2): according to the coding rule of the attribute assignment of differentiating of unit, divisional and sub-divisional in the BIM model of each station and section, conducting the attribute assignment of differentiating of unit, divisional and sub-divisional for the BIM model of each station and section.

Step 6: based on the work construction information sharing platform based on GIS+BIM, developing a platform for intelligent management of integration of construction and maintenance of rail transportation work. Specifically, the intelligent management platform for integration of construction and maintenance of rail transportation work includes the work construction information management platform based on progress control and the rail transportation operation and maintenance platform based on the integration of construction and maintenance, and has the function of big data analysis;

wherein, the work construction information sharing platform based on GIS+BIM provides a basic data support of rail transportation work, the work construction information management platform based on progress control provides an information management function in the work construction stage, and the rail transportation operation and maintenance platform based on the integration of construction and maintenance provides an information management function in the rail transportation operation and maintenance stage.

The basic data supports of rail transportation work mainly refers to a shared service of information of geological exploration and pipelines of 3D geological management platform and spatio-temporal pipelines and attribute characteristics of the BIM model, etc.

during the development of the work construction information management platform based on progress control and the rail transportation operation and maintenance platform based on the integration of construction and maintenance, conducting an attribute assignment of differentiating for document attributes according to the coding rule of the attribute assignment of differentiating of unit, divisional and sub-divisional in the BIM model of each station and section.

The work construction information management platform based on progress control includes a work preparation planning unit, a contract performance and measurement and pricing unit, a safety and quality inspection unit, a risk early warning management and control unit, a design change unit, etc.

the work preparation plan unit mainly realizes the functions of formulation, implementation, assessment and archiving of the work preparation plan of the supervision unit and the contractor.

The formulation of the work preparation plan is realized as follows:

step (6-1): based on the BIM model of each station and section divided by unit, divisional and sub-divisional, through the big data analysis, automatically generating a first draft of work preparation plan for work construction;

step (6-2): sending the first draft of the work preparation plan to the contractor, and the contractor puts forward modification opinions on the first draft of the work preparation plan according to the actual situation, upload and submit it to the corresponding supervision unit;

step (6-3): reviewing, by the supervision unit, the modification opinions submitted by the contractor according to the requirements of the work construction period node, and reporting and sending the modification opinions to the owner after passing the review; if the review fails, distributing and feeding the failed modification opinions back to the contractor in time;

step (6-4): according to the modification opinions sent by the supervision unit, further revising the first draft of the work preparation plan by the owner, forming the work preparation plan, and distributing the work preparation plan to the supervision unit and the contractor;

step (6-5): according to the work preparation plan, through mathematical calculation and analysis, identifying key nodes; sending a decision prediction notice one month before the key node; if the key node is not completed, sending a post-processing notice the next day;

the decision prediction notice refers to the necessary preconditions for the completion of the key nodes, including important nodes affecting the key nodes, process conditions for the completion of the key nodes, allocation of personnel and strength of materials for the completion of the key nodes, controlled work quality and safety risk factors ensuring the completion of the key nodes, the possible social emergencies during the completion period of the key nodes, etc.

the post-processing notice refers to decision-making opinions provided when the key nodes are not completed, including main factors and main units leading to the non-completion of the key nodes, an impact of the non-completion of the key nodes on the subsequent nodes (such as work quality, safety, progress, etc.), and an adjustment plan made passively (such as construction period adjustment, construction process adjustment, human and material resources allocation, etc.).

The contract performance and measurement and pricing unit mainly realizes functions of measurement, payment and archiving of work funds of the supervision unit and the contractor.

The safety and quality inspection unit mainly realizes functions of inspection issuance, rectification reporting, assessment and archiving of hidden dangers of the project safety and quality of the supervision unit and the contractor.

The risk early warning management and control unit mainly realizes functions of upload, analysis, early warning, assessment and archiving of monitoring data of the third-party monitoring units.

The design change management unit mainly realizes functions of handling, assessment and archiving of design change process of the work verification of the supervision unit and the contractor.

The work preparation planning unit, the safety and quality investigation unit, the risk early warning management and control unit and the design change unit all establish a linkage mechanism with the contract performance and measurement and pricing unit. The assessment results in the work preparation planning unit, safety and quality inspection unit, risk early warning management and control unit and design change unit belong to a type of punishment, and the supervision unit and the contractor shall feed the punishment information back to the contract performance and measurement and pricing unit.

The rail transportation operation and maintenance platform based on the integration of construction and maintenance includes equipment and materials management unit and a safety risk early warning unit;
   wherein, the equipment and materials management unit mainly realizes functions of information statistics, query and analysis of equipment and materials, equipment maintainable management and reminder, equipment operation and maintenance monitoring, fault equipment alarm, etc.

The function of the information statistics, query and analysis of equipment and materials, including the information statistics, query and analysis of equipment and materials used for operation and maintenance and the equipment and materials of spare parts.

The function of the equipment maintenance management and reminder refers to maintenance period statistics, query and reminder of equipment used in operation and maintenance.

The equipment operation and maintenance monitoring function, being realized through signal linkage with equipment systems of a FAS, a BAS and an ISCS.

The function of the fault equipment alarm refers to an alarm when the equipment used for operation and maintenance fails.

The safety risk early warning unit mainly realizes functions of tunnel structure monitoring, third-party measurement and control, safety accident early warning and handling, etc.

The tunnel structure monitoring includes on-site investigation, upload, rectification and feedback of underground tunnel segments, mine tunnels and other structures.

The third-party measurement control refers to the collection and analysis of third-party monitoring data during rail transportation operation and maintenance, and alarming when the measurement control value is exceeded.

The safety accident early warning and handling refers to, during the operation and maintenance of rail transportation, when a safety accident occurs or is predicted, the safety accident being patrolled and reported by on-site patrol person, and rectifying and feeding back by relevant responsible person.

Step (7): after the acceptance of electromechanical specialty project of rail transportation work is passed, according to requirements of the material management and operation and maintenance, integrating the necessary electromechanical equipment information into a two-dimensional code, and pasting a identification of the produced two-dimensional code on an eye-catching position of the corresponding equipment for daily management;
   wherein, the equipment information mainly includes but is not limited to manufacturer name, production date, maintenance date, equipment code, service life, etc.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A platform for intelligent management of integration of construction and maintenance of rail transportation work, comprising:
   a work construction information sharing module based on Geographic Information System (GIS) and Building Information Module (BIM), being configured to realize a fusion and data sharing between a BIM model of each station and section of the rail transportation and a 3D geological management platform of rail transportation, and providing a basic data support for a work construction informatization management module based on progress control and a rail transportation operation and maintenance module based on the integration of construction and maintenance;
   the work construction informatization management module based on progress control, being configured to, based on the basic data provided by the work construction information sharing module based on GIS and BIM, provide an informatization management and control of a work preparation plan, a contract performance and measurement and pricing, a safety and quality investigation, a risk early warning and a design change in a work construction phase;
   the rail transportation operation and maintenance module based on the integration of construction and maintenance, being configured to, based on the basic data provided by the work construction information sharing module based on GIS and BIM, provide an information management and control of equipment, materials and safety risk early warning in a rail transportation operation and maintenance phase.

2. The intelligent management platform according to claim 1, wherein the 3D geological management platform of rail transportation, specifically including:
   according to work planning and construction route maps and preliminary design of the station building maps, generating a first edition of the 3D geological management platform integrating geology, geophysical exploration pipeline, station line and station contour model through GIS software, counting collision situations between pipelines and stations;
   according to municipal pipeline relocation and restoration maps and municipal pipeline connection maps, adding municipal pipeline information to the first edition of the 3D geological management platform through a GIS software to form the 3D geological management platform for rail transportation and counting the collision situation between the pipelines and the stations.

3. The intelligent management platform according to claim 1, wherein a construction process of the BIM model of each station and section of rail transportation, the construction process comprising steps of:

according to architectural drawings and structural drawings of stations and sections of rail transportation, through the BIM modeling, generating a civil BIM model for each station and section; counting the collision situation of components in the civil BIM model;

according to decoration drawings of stations of rail transportation, through the BIM modeling, generating a decoration BIM model for each station; counting the collision situation of components in the decoration BIM model of each station;

according to electromechanical installation drawings of rail transportation station, through the BIM modeling, generating a electromechanical BIM model for each station and section; counting the collision situation of components in the electromechanical BIM model of each station;

adding equipment information to the electromechanical BIM model of each station and section;

adding the decoration BIM model and electromechanical BIM model of each station and section to the civil BIM model of each station and section to form the BIM model of each station and section of rail transportation; counting the collision situation of components in BIM model of each station and section.

4. The intelligent management platform according to claim 1, wherein the basic data provided by the engineering construction information sharing module of GIS and BIM, including: a sharing between geological exploration and pipelines of the 3D geological management platform and spatio-temporal pipeline and attribute feature information of the BIM model.

5. The intelligent management platform according to claim 1, wherein the work construction informatization management module based on progress control, comprising:

a work preparation planning unit, being configured to realize a formulation, an implementation, an assessment and an archiving of the work preparation plan of a supervision unit and contractors;

a contract performance and measurement and pricing unit, being configured to realize a measurement, a payment and an archiving of work funds of the supervision unit and the contractors;

a safety and quality investigation unit, being configured to realize an investigation issuance, a rectification reporting, an assessment and an archiving of hidden dangers of work safety and quality of the supervision unit and the contractors;

a risk early warning management and control unit, being configured to realize an upload, an analyze, a warning, an assessment and an archiving of monitoring data of a third-party monitoring unit;

a design change management unit, being configured to realize a work visa, a design change process handling, an assessment and an archiving of the supervision unit and contractors.

6. The intelligent management platform according to claim 1, wherein the rail transportation operation and maintenance module based on the integration of construction and maintenance, comprising:

an equipment and materials management unit, being configured to realize the information statistics, query and analysis of equipment and materials, equipment maintenance management and reminder, equipment operation and maintenance monitoring and fault equipment alarm;

a safety risk early warning unit, being configured to realize tunnel structure monitoring, third-party measurement and control, and safety accident early warning and handling.

7. A method for intelligent management of integration of construction and maintenance of rail transportation work, comprising:

establishing a 3D geological management platform based on geological exploration data of rail transportation works;

generating a BIM model for each station and section according to construction drawings of rail transportation construction stage;

further revising the 3D geological management platform according to municipal design drawings of rail transportation;

fusing the BIM model of each station and section with the revised 3D geological management platform to realize a data sharing;

conducting an attribute assignment of unit, divisional and sub-divisional for the BIM model of each station and section;

establishing respectively a work construction information management platform based on progress control and a rail transportation operation and maintenance platform based on the integration of construction and maintenance, based on the shared data.

8. The intelligent management method according to claim 7, wherein fusing the BIM model of each station and section with the 3D geological management platform to realize a data sharing, a specific process of the integration including:

generating the BIM model of each station and section into a model data set;

adding the model data set, through a GIS software, to the 3D geological management platform, making appropriate adjustment and optimization for the platform, establishing a data fusion and sharing platform between the BIM model of each station and section and the 3D geological management platform.

9. The intelligent management method according to claim 7, wherein conducting an attribute assignment of unit, divisional and sub-divisional for the BIM model of each station and section, a specific process of the attribute assignment including:

establishing a coding rule of the attribute assignment of differentiating of unit, divisional and sub-divisional in the BIM model of each station and section;

conducting the attribute assignment of differentiating of unit, divisional and sub-divisional for the BIM model of each station and section, according to the coding rule of the attribute assignment of differentiating of unit, divisional and sub-divisional in the BIM model of each station and section.

10. The intelligent management method according to claim 7, wherein conducting the attribute assignment of differentiating for document attributes according to the coding rule of the attribute assignment of differentiating of unit, divisional and sub-divisional in the BIM model of each station and section, during the development of the work construction information management platform based on progress control and the rail transportation operation and maintenance platform based on the integration of construction and maintenance.

* * * * *